United States Patent
Shimono et al.

(10) Patent No.: US 9,779,559 B2
(45) Date of Patent: Oct. 3, 2017

(54) CIRCUIT FOR MONITORING ABNORMALITY OF ECU

(71) Applicants: DENSO CORPORATION, Kariya, Aichi-Pref. (JP); ADVICS CO., LTD., Kariya, Aichi-Pref. (JP)

(72) Inventors: Shinichi Shimono, Anjo (JP); Kazuhiro Imoto, Kariya (JP); Risa Ito, Chiryu (JP)

(73) Assignees: DENSO CORPORATION, Kariya, Aichi-pref. (JP); ADVICS CO., LTD., Kariya, Aichi-pref. (JP)

( * ) Notice: Subject to any disclaimer, the term of this patent is extended or adjusted under 35 U.S.C. 154(b) by 422 days.

(21) Appl. No.: 14/385,610

(22) PCT Filed: Mar. 15, 2013

(86) PCT No.: PCT/JP2013/057354
§ 371 (c)(1),
(2) Date: Sep. 16, 2014

(87) PCT Pub. No.: WO2013/137425
PCT Pub. Date: Sep. 19, 2013

(65) Prior Publication Data
US 2015/0046115 A1    Feb. 12, 2015

(30) Foreign Application Priority Data
Mar. 16, 2012   (JP) ................. 2012-059676

(51) Int. Cl.
*G06F 19/00*    (2011.01)
*G07C 5/08*    (2006.01)
(Continued)

(52) U.S. Cl.
CPC ........ *G07C 5/0808* (2013.01); *G06F 11/0739* (2013.01); *G06F 11/0757* (2013.01); *G06F 11/0793* (2013.01); *G06F 1/24* (2013.01)

(58) Field of Classification Search
CPC ............. G06F 11/0739; G06F 11/0757; G06F 11/0793; G07C 5/0808
(Continued)

(56) References Cited

U.S. PATENT DOCUMENTS 6,792,564 B2 *   9/2004   Ahrens, Jr. ......... G06F 11/0712
                                                              714/31
7,178,069 B2 *   2/2007   Hashimoto ......... G06F 11/0736
                                                              701/1
(Continued)

FOREIGN PATENT DOCUMENTS

EP   0 575 874    12/1993
EP   0575854 A2   12/1993
(Continued)

OTHER PUBLICATIONS

International Preliminary Report on Patentability (in Japanese with English Translation) for PCT/JP2013/057354, issued Sep. 25, 2014; ISA/JP.
(Continued)

*Primary Examiner* — An Do
(74) *Attorney, Agent, or Firm* — Harness, Dickey & Pierce, P.L.C.

(57) ABSTRACT

An abnormality monitoring circuit of an ECU includes a microcomputer, a reset circuit that resets the microcomputer, a monitor circuit that monitors the operation of the microcomputer, and an output circuit that activates an external actuator. The monitor circuit has an abnormality decision signal output section that outputs an abnormality decision signal to the output circuit when not being able to confirm
(Continued)

that an output of a normal monitor signal of the microcomputer has occurred within an abnormality decision time. The monitor circuit has a reset decision signal output section that outputs a reset decision signal to the reset circuit when not being able to confirm that an output of the normal monitor signal of the microcomputer has occurred within a BIST (Built In Self Test) completion time of the microcomputer and a reset decision time set to a time longer than the abnormality decision time.

2 Claims, 2 Drawing Sheets

(51) Int. Cl.
 *G06F 11/07* (2006.01)
 *G06F 1/24* (2006.01)
(58) Field of Classification Search
 USPC .......................................... 702/108, 117–119
 See application file for complete search history.

(56) References Cited

U.S. PATENT DOCUMENTS

2002/0124213 A1  9/2002  Ahrens et al.
2008/0010563 A1  1/2008  Nishimura

FOREIGN PATENT DOCUMENTS

| JP | S62145337 A  | 6/1987  |
| JP | H05233374 A  | 9/1993  |
| JP | 06-004353    | 1/1994  |
| JP | H064353 B2   | 1/1994  |
| JP | H06175992 A  | 6/1994  |
| JP | H1165893 A   | 3/1999  |
| JP | 2005165415 A | 6/2005  |
| JP | 2006244522 A | 9/2006  |
| JP | 3884938 B2   | 2/2007  |
| JP | 2007334587 A | 12/2007 |
| JP | 2008225807 A | 9/2008  |

OTHER PUBLICATIONS

International Search Report (in Japanese with English Translation) for PCT/JP2013/057354, mailed Apr. 9, 2013; ISA/JP.
Written Opinion for PCT/JP2013/057354, mailed Apr. 9, 2013; ISA/JP.
Office Action dated Dec. 16, 2014 in corresponding Japanese Application No. 2012-059676.

* cited by examiner

CIRCUIT FOR MONITORING ABNORMALITY OF ECU

CROSS REFERENCE TO RELATED APPLICATIONS

This application is a U.S. National Phase Application under 35 U.S.C. 371 of International Application No. PCT/JP2013/057354 filed on Mar. 15, 2013 and published in Japanese as WO 2013/137425 A1 on Sep. 19, 2013. This application is based on and claims the benefit of priority from earlier Japanese Patent Application No. 2012-059676 filed Mar. 16, 2012. The entire disclosures of all of the above applications are incorporated herein by reference.

TECHNICAL FIELD

The present invention relates to a circuit for monitoring an abnormality of an ECU (Electronic Control Unit) installed in a vehicle and, in particular, to a circuit for monitoring an abnormality of an ECU that includes a microcomputer having a BIST (Built In Self Test) function.

BACKGROUND ART

An in-vehicle ECU performs controls including ESC (Electronic Stability Control). Such an in-vehicle ECU is provided with a microcomputer but in the event that an abnormality occurs in the microcomputer, the abnormality is required to be monitored. In an example exemplified in PLT 1, a watchdog signal or a monitoring signal in for example in serial communication is used for the monitoring of an abnormality.

These monitoring signals are monitored by a power IC or the like. If a normal state cannot be confirmed through monitoring over a given period, a reset signal is outputted in such an in-vehicle ECU to restart the microcomputer.

Patent Literature 1 JP-A-H11-065893

However, where the microcomputer of an in-vehicle ECU has a BIST (Built In Self Test) function, user programs are not started during a BIST period that follows power-on. Therefore, resultantly, a normal-state signal is not outputted. With this configuration, if this BIST time is longer the time of abnormality monitoring performed by the power IC, a reset signal is outputted before BIST is completed and thus the microcomputer is reset by the output. For this reason, the microcomputer is not able to perform a normal startup operation.

SUMMARY

Hence it is desired to provide a monitoring circuit for a microcomputer, which does not output a reset signal before completion of BIST and does not impair the performance of the system.

In consideration of the foregoing related art, an example of an abnormality monitoring circuit for an ECU is provided. The abnormality monitoring circuit includes a microcomputer, a reset circuit that resets the microcomputer, a monitor circuit that monitors the operation of the microcomputer, and an output circuit that activates an external actuator. In the abnormality monitoring circuit, the monitor circuit has an abnormality decision signal output means and a reset decision signal output means. The monitor circuit is provided in advance with settings of an abnormality decision time and a reset decision time. The reset decision time is set to a time longer than the abnormality decision time. The abnormality decision signal output means outputs an abnormality decision signal to the output circuit when not being able to confirm that an output of a normal monitor signal of the microcomputer has occurred within the abnormality decision time. The reset decision signal output means outputs a reset decision signal to the reset circuit when not being able to confirm that an output of the normal monitor signal of the microcomputer has occurred within a BIST completion time of the microcomputer and the reset decision time.

According to this configuration, the monitor circuit outputs the abnormality decision signal to the output circuit when not being able to confirm that an output of the normal monitor signal of the microcomputer has occurred within the abnormality decision time. Further, the monitor circuit outputs the reset decision signal to the reset circuit when not being able to confirm that an output of the normal monitor signal of the microcomputer has occurred within the BIST completion time of the microcomputer and the reset decision time. Accordingly, the startup of the microcomputer is normally conducted, while the provision of the abnormality decision time enables output of the abnormality decision signal, regardless of the BIST completion time. Thus, the configuration guarantees beneficial effects of quickly and reliably responding to the occurrence of an abnormality.

DETAILED DESCRIPTION OF EMBODIMENTS

Figure 1:
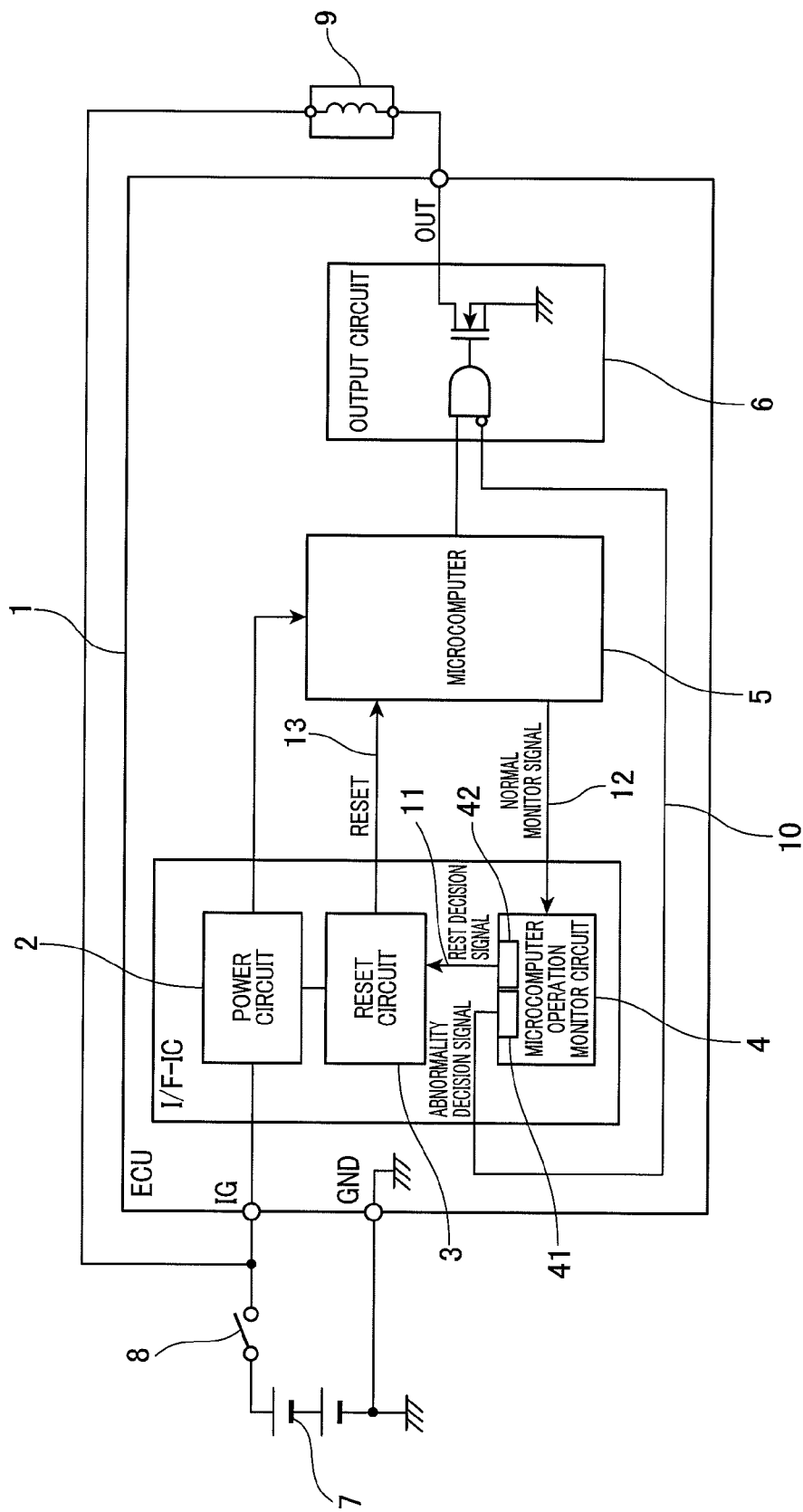
FIG. 1 is a block circuit diagram of an ECU for a vehicle, according to an embodiment of an abnormality monitoring circuit for an ECU of the present invention.

With reference to the drawings, hereinafter is described an embodiment to which the present invention is applied. However, in the drawings referred to in the specification, mutually corresponding portions are given the same reference numerals for the sake of omitting explanation, later, on the overlapped portions.

FIG. 1 is a block circuit diagram of an ECU 1 for a vehicle, according to an embodiment of an abnormality monitoring circuit for an ECU of the present invention. The ECU 1 is used such as for a brake system of a vehicle. Other than the ECU 1, FIG. 1 shows a battery 7, a switch 8 and an actuator 9. The battery 7 and the switch 8 supply power to the ECU 1. The actuator 9 is arranged on the output side of the ECU 1 and composed of a pump, a solenoid, or other members.

The ECU 1 includes a microcomputer 5, a reset circuit 3, a monitor circuit 4, an output circuit 6 and a power circuit 2. The reset circuit 3 resets the microcomputer 5. The monitor circuit 4 monitors the operation of the microcomputer 5. The output circuit 6 activates an external actuator. The power circuit 2 supplies power to the individual circuits. The microcomputer 5 uses the power supplied from the power circuit 2 to carry out an arithmetic processing and outputs the results to the output circuit 6. The arithmetic processing is carried out on the basis of the inputs received such as from sensors, not shown, and stored data.

The monitor circuit 4 includes an abnormality decision signal output circuit 41 and a reset decision signal output circuit 42. The monitor circuit 4 has a function of monitoring a normal monitor signal 12 outputted from the microcomputer 5. The normal monitor signal 12 is a signal produced based on a watchdog signal, serial communication or the like. The monitor circuit 4 is provided in advance with settings of an abnormality decision time T1 and a reset decision time T3. The reset decision time T3 is set to a time longer than the abnormality decision time T1. When the monitor circuit 4 is not able to confirm that an output of the normal monitor signal 12 of the microcomputer 5 has occurred within the abnormality decision time T1, the monitor circuit 4 outputs the abnormality decision signal 10 to the output circuit 6 from the abnormality decision signal output circuit 41. Further, when the monitor circuit 4 is not able to confirm that the normal monitor signal 12 of the microcomputer 5 has occurred within a BIST (Built In Self Test) completion time T2 and the reset decision time T3, the monitor circuit 4 subsequently outputs the reset decision signal 11 to the reset circuit 3 from the reset decision signal output circuit 42.

Figure 2:
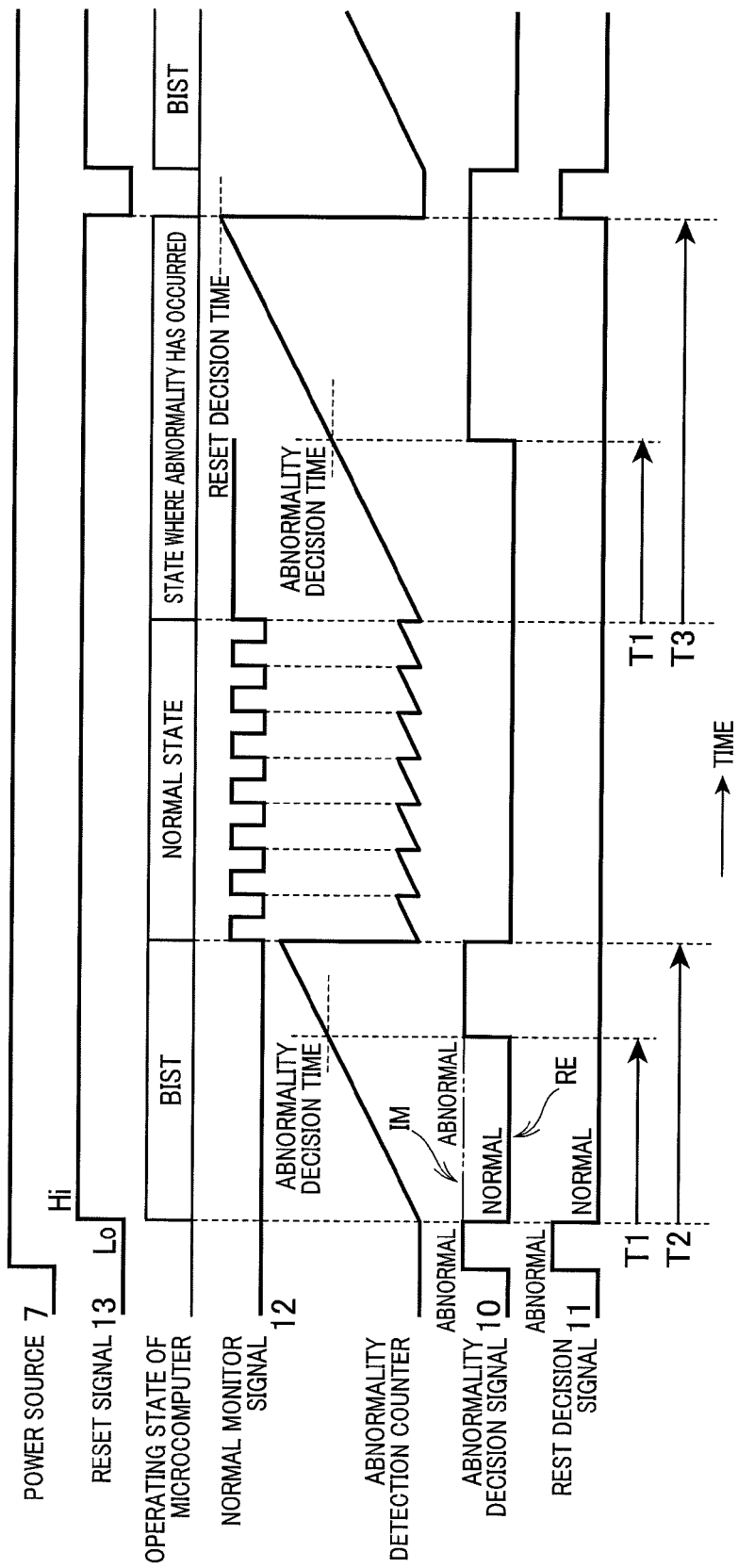
FIG. 2 is a time chart indicating the states of an abnormality detection counter and various signals of the abnormality monitoring circuit for an ECU of the present invention.

FIG. 2 is a time chart indicating the states of an abnormality detection counter and individual signals of the abnormality monitoring circuit for an ECU of the present invention. Referring to FIG. 2, hereinafter is described a relationship of the abnormality decision signal 10 and the reset decision signal 11 to the abnormality decision time T1, the BIST completion time T2 and the reset decision time T3, being correlated such as to the normal monitor signal 12 and the reset signal 13.

Upon closure of the switch 8 followed by power supply to the ECU 1 from the battery 7, the reset signal 13 turns from Lo (low) to Hi (high), when the microcomputer 5 is brought into a BIST state. At the same time, the abnormality detection counter starts counting the abnormality decision time T1 and the reset decision time T3 set in the monitor circuit 4. In this case, the microcomputer 5 does not output the normal monitor signal 12 because it is in the BIST state. Usually, the abnormality decision time T1 is set to a time shorter than the BIST completion time T2. Accordingly, the count of the abnormality detection counter reaches the expiration of the abnormality decision time T1 while in the BIST state. Thus, the abnormality decision signal 10 is outputted from the abnormality decision signal output circuit 41 to the output circuit 6. The description here is given by way of an example in which the output of the abnormality decision signal 10 begins with a normal state (see the solid line RE). However, since the reset decision time T3 is set to a time longer than the BIST completion time T2, the reset decision signal 11 is not outputted from the reset decision signal output circuit 42 to the reset circuit 3. Thus, the abnormality decision signal 10 inhibits in the output circuit 6 current supply to the actuator 9. In this way, unlike the conventional art, the abnormality monitoring circuit of the present embodiment does not output an abnormality decision signal to a reset circuit. Accordingly, the microcomputer 5 can be normally started.

After lapse of the BIST completion time T2, the microcomputer 5 turns to a normal state and outputs the normal monitor signal 12. The abnormality detection counter starts counting the abnormality decision time T1 and the reset decision time T3 set in the monitor circuit 4. However, since the abnormality detection counter is constantly reset by the normal monitor signal 12 that is successively issued in a short time, neither the abnormality decision signal 10 nor the reset decision signal 11 is outputted.

The abnormality decision time T1 is set to a time shorter than the reset decision time T3. Accordingly, in the event that an abnormality occurs for some reasons and the normal monitor signal 12 is interrupted while the microcomputer 5 is in continuous operation, the count of the abnormality detection counter reaches the expiration of the abnormality decision time T1 while the reset decision time T3 is being counted. As a result, the abnormality decision signal 10 is outputted from the monitor circuit 4. Thus, the abnormality decision signal 10 inhibits in the output circuit 6 current supply to the actuator 9. In an ECU of a brake system, such as an antiskid brake system, a response delay raises a problem. In this regard, by applying the present invention to the ECU of such a brake system, effective control can be exerted without having to wait for the lapse of the reset decision time T3 which is set to a much longer time than the comparatively long BIST completion time.

After lapse of the abnormality decision time T1, the output circuit 6 is brought into an output inhibited state. In this case, when the monitor circuit 4 is not able to confirm an output of the normal monitor signal 12 for a duration of time in the reset decision time T3, the monitor circuit 4 outputs the reset decision signal 11. Receiving the input of the reset decision signal 11, the reset circuit 3 outputs the reset signal 13 to reset the microcomputer 5.

As will be apparent from the foregoing detailed description, the abnormality monitoring circuit of the ECU 1 of the present embodiment includes the microcomputer 5, the reset circuit 3 for resetting the microcomputer 5, the monitor circuit 4 for monitoring the operation of the microcomputer 5, and the output circuit 6 for activating an external actuator. The monitor circuit 4 includes the abnormality decision signal output means 41 and the reset decision signal output means 42. The monitor circuit 4 is provided in advance with settings of the abnormality decision time T1 and the reset decision time T3. The reset decision time T3 is set to a longer time than the abnormality decision time T1. The abnormality decision signal output means 41, when it is unable to confirm that an output of the normal monitor signal 12 of the microcomputer 5 has occurred within the abnormality decision time T1, outputs the abnormality decision signal 10 to the output circuit 6. The reset decision signal output means 42, when it is unable to confirm that an output of the normal monitor signal 12 of the microcomputer 5 has occurred within the BIST completion time T2 of the microcomputer 5 and the reset decision time T3, outputs the reset decision signal 11 to the reset circuit 3.

In this way, the monitor circuit 4 outputs the abnormality decision signal 10 to the output circuit 6 when not being able to confirm that an output of the normal monitor signal 12 of the microcomputer 5 has occurred within the abnormality decision time T1. Further, the monitor circuit 4 outputs the reset decision signal 11 to the reset circuit 3 when not being able to confirm that an output of the normal monitor signal 12 of the microcomputer 5 has occurred within the BIST completion time T2 of the microcomputer 5 and the reset decision time T3. Accordingly, the startup of the microcomputer 5 is conducted normally, while the provision of the abnormality decision time T1 enables output of the abnormality decision signal 10, regardless of the BIST completion time T2. Thus, the abnormality monitoring circuit of the ECU 1 of the present embodiment guarantees beneficial effects of quickly and reliably responding to the occurrence of an abnormality.

In the present embodiment, the abnormality decision signal 10 at the time when the reset signal 13 has turned from Lo to Hi begins with a normal state. Alternatively to this, the abnormality decision signal 10 may be ensured to begin with an abnormal state only when the reset signal turns from Lo to Hi (see the dash-dot-dot line IM of FIG. 2).

The present invention should encompass those modes which include additional changes, modifications, improvements and the like that could be carried out on the basis of the knowledge of a skilled person. As a matter of course, these modes that include the additional changes and the like should be construed as being included in the scope of the present invention as far as the changes and the like do not depart from the spirit of the present invention.

REFERENCE SIGNS LIST

1 ECU
3 Reset circuit
4 Monitor circuit
5 Microcomputer
6 Output circuit
10 Abnormality decision signal
11 Reset decision signal
12 Normal monitor signal
T1 Abnormality decision time
T2 BIST completion time
T3 Rest decision time
41 Abnormality decision signal output circuit
42 Reset decision signal output circuit

What is claimed is:

1. An abnormality monitoring circuit for an ECU comprising a microcomputer, a reset circuit that resets the microcomputer, a monitor circuit that monitors operation of the microcomputer, and an output circuit that activates an external actuator, characterized in that:
the monitor circuit comprises:
an abnormality decision signal output means for outputting an abnormality decision signal to the output circuit when the monitor circuit is not able to confirm that an output of a normal monitor signal of the microcomputer has occurred within an abnormality decision time, the abnormality decision signal preventing an output of the output circuit to the external actuator; and
a reset decision signal output means for outputting a reset decision signal to the reset circuit when the monitor circuit is not able to confirm that the output of the normal monitor signal of the microcomputer has occurred within a reset decision time, the reset decision time being set to be longer than a BIST (Built In Self Test) completion time of the microcomputer and the abnormality decision time.

2. An abnormality monitoring circuit for an ECU comprising a microcomputer, a reset circuit that resets the microcomputer, a monitor circuit that monitors operation of the microcomputer, and an output circuit that activates an external actuator, characterized in that:
the monitor circuit comprises:
an abnormality decision signal output means for outputting an abnormality decision signal to the output circuit when the monitor circuit is not able to confirm that an output of a normal monitor signal of the microcomputer has occurred within an abnormality decision time; and
a reset decision signal output means for outputting a reset decision signal to the reset circuit when the monitor circuit is not able to confirm that the output of the normal monitor signal of the microcomputer has occurred within a reset decision time, the reset decision time being set to be longer than a BIST (Built In Self Test) completion time of the microcomputer and the abnormality decision time; and that:
the abnormality decision time is set to be shorter than the BIST completion time.

* * * * *